United States Patent
Chen et al.

(10) Patent No.: US 8,004,531 B2
(45) Date of Patent: Aug. 23, 2011

(54) MULTIPLE GRAPHICS PROCESSOR SYSTEMS AND METHODS

(75) Inventors: Wen-Chung Chen, Cupertino, CA (US);
Li Liang, Shanghai (CN); Shou-Yu Joyce Cheng, San Jose, CA (US); Dehai (Roy) Kong, Cupertino, CA (US); Mitch Singer, Oviedo, FL (US)

(73) Assignee: Via Technologies, Inc., Taipei (TW)

( * ) Notice: Subject to any disclaimer, the term of this patent is extended or adjusted under 35 U.S.C. 154(b) by 1103 days.

(21) Appl. No.: 11/549,409

(22) Filed: Oct. 13, 2006

(65) Prior Publication Data

US 2007/0115291 A1    May 24, 2007

Related U.S. Application Data

(60) Provisional application No. 60/726,787, filed on Oct. 14, 2005.

(51) Int. Cl.
    *G06F 15/16*    (2006.01)
    *G06F 15/00*    (2006.01)
    *G06T 1/00*     (2006.01)
(52) U.S. Cl. ......................... 345/502; 345/501
(58) Field of Classification Search .......... 345/501–506, 345/519, 520, 522
    See application file for complete search history.

(56) References Cited

U.S. PATENT DOCUMENTS

| | | | |
|---|---|---|---|
| 6,747,654 B1 * | 6/2004 | Laksono et al. | 345/502 |
| 6,809,733 B2 * | 10/2004 | Mukherjee et al. | 345/504 |
| 6,885,376 B2 * | 4/2005 | Tang-Petersen et al. | 345/506 |
| 7,075,541 B2 * | 7/2006 | Diard | 345/505 |
| 7,372,465 B1 * | 5/2008 | Tamasi et al. | 345/502 |
| 7,545,380 B1 * | 6/2009 | Diard et al. | 345/505 |
| 2004/0196289 A1 * | 10/2004 | Langendorf et al. | 345/502 |
| 2005/0041031 A1 | 2/2005 | Diard | |

OTHER PUBLICATIONS

Taiwanese language office action dated Dec. 29, 2009.

* cited by examiner

*Primary Examiner* — Kee M Tung
*Assistant Examiner* — Jacinta M Crawford
(74) *Attorney, Agent, or Firm* — Thomas, Kayden, Horstemeyer & Risley, LLP

(57) ABSTRACT

Multiple graphics processor system and method embodiments are disclosed. One system embodiment, among others, comprises a multiple graphics processor system, comprising a first graphics processing unit having first status information and a second graphics processing unit having second status information, and first key logic corresponding to the first graphics processing unit, the first key logic configured to compare the first and second status information and communicate to the first graphics processing unit a key corresponding to the lowest completed stage of processing among the first and second graphics processing units.

19 Claims, 5 Drawing Sheets

MULTIPLE GRAPHICS PROCESSOR SYSTEMS AND METHODS

CROSS-REFERENCE TO RELATED APPLICATION

This application claims priority to copending U.S. provisional application entitled, "MULTI-PROCESSOR SYSTEMS AND METHODS," having Ser. No. 60/726,787, filed Oct. 14, 2005, which is entirely incorporated herein by reference.

TECHNICAL FIELD

The present disclosure is generally related to data processing systems, and more particularly, is related to computer graphics systems and methods.

BACKGROUND

Computer graphics is the art and science of generating pictures, images, or other graphical or pictorial information with a computer. Generation of the pictures or images is commonly called rendering. Generally, in three-dimensional (3D) computer graphics, geometry that represents surfaces (or volumes) of objects in a scene is translated into pixels (picture elements), stored in a frame buffer, and then displayed on a display device.

One rendering mechanism involves use of a graphics system comprising multiple graphics processors (e.g., graphics processing units or GPUs) with associated frame buffers. Each GPU and associated frame buffer is responsible for rendering a designated time sequence or portion of the picture or image on a designated portion of the display. For instance, a sky scene may be rendered from four frame buffers, with the final display rendering typically under the control of one of the graphics processors (herein, referred to as a display controller).

Various techniques may be employed to coordinate rendering by multiple GPUs. One technique is referred to as split frame rendering, and involves dividing the rendering into even and odd frames. For example, one GPU is responsible for even frames rendering, another GPU for odd frames rendering. In another type of split frame rendering technique, one GPU may be responsible for rendering a lower picture of the display and another GPU may be responsible for rendering an upper portion of the display. Another technique conventionally employed involves dividing the job between multiple GPUs in the time domain, often referred to as alternate frame rendering.

Such arrangements for rendering pictures or images are not without challenges. One challenge involves synchronization. For instance, with regard to split frame rendering, the final display comprises rendered images from multiple frame buffers. Thus, the rendering of the final display may not commence until processing is complete for each respective frame buffer.

Another challenge involves determining how to share memory. For instance, particular texture processing can be determined at the application level by a host processor (e.g., central processing unit or CPU), at the front end of a graphics processor (e.g., by a vertex shader program generating texture type data maps), or can be implemented in a post-processing manner (e.g., by pixel shader generation of a post-processing image rendered in the master controller frame buffer). In the latter cases, rendering occurs to a local GPU (frame) buffer and this rendered texture surface can be shared among multiple GPUs, which should be able to fetch and filter samples for portions of the image split among several graphics processing units. Retrieving the desired texture data from the respective buffers needs to be synchronized with end of texture rendering. Otherwise read-after write (RAW) hazards may occur when one GPU start to read a surface that is still being rendered by another GPU.

SUMMARY

Embodiments of the present disclosure provide systems and methods for synchronizing multiple graphics processing units (GPUs) that perform processing of various portions of an image to be rendered. Such processing can include processing on a post-rendered image, such as texture processing. Several embodiments are disclosed that synchronize processing among the various GPUs through the use of a key or status indicator corresponding to status information that is communicated among one or more GPUs via one or more bus interface units (BIUs). The keys provide an indication of status of processing (e.g., for display rendering, texture surface processing, etc.) for a corresponding GPU. Key logic in each respective BIU compares the key values corresponding to processing status of the various GPUs. The key logic then returns a key to its corresponding GPU, where an additional comparison is made to determine whether to unlock access to a display controller (i.e., a GPU responsible for final display or texture surface rendering). Once access is available to a particular GPU or associated frame buffer, the particular GPU can provide (e.g., via push or pull mechanisms) data to a display controller or associated buffer for use in display or texture surface processing in synchronous manner.

Briefly described, in architecture, one embodiment comprises a multiple graphics processor system, comprising a first graphics processing unit having first status information and a second graphics processing unit having second status information, and first key logic corresponding to the first graphics processing unit, the first key logic configured to compare the first and second status information and communicate to the first graphics processing unit a key corresponding to the lowest completed stage of processing among the first and second graphics processing units.

The present disclosure also includes various method embodiments. In this regard, one embodiment of such a method, among others, taken from the perspective of key logic in a BIU, can be broadly summarized by the following steps: receiving first status information corresponding to completion of processing at a first graphics processing unit, receiving second status information corresponding to completion of processing at a second graphics processing unit, comparing the first and second status information, and communicating to the first graphics processing unit a key corresponding to the lowest completed stage of processing among the first and second graphics processing units.

Additional method embodiments include a method embodiment taken from the perspective of a GPU, which can be broadly summarized by the following steps: receiving a key at a graphics processing unit, the key having a key value corresponding to the lowest completed stage of processing among a plurality of graphics processing units, comparing the key with status information corresponding to completion of processing at the graphics processing unit, and providing access to associated display rendering data or texture surface data if the key value is larger than or equal to a value corresponding to the status information.

Other systems, methods, features, and advantages of the present disclosure will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the disclosed systems and methods can be better understood with reference to the following drawings. The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Figure 1:
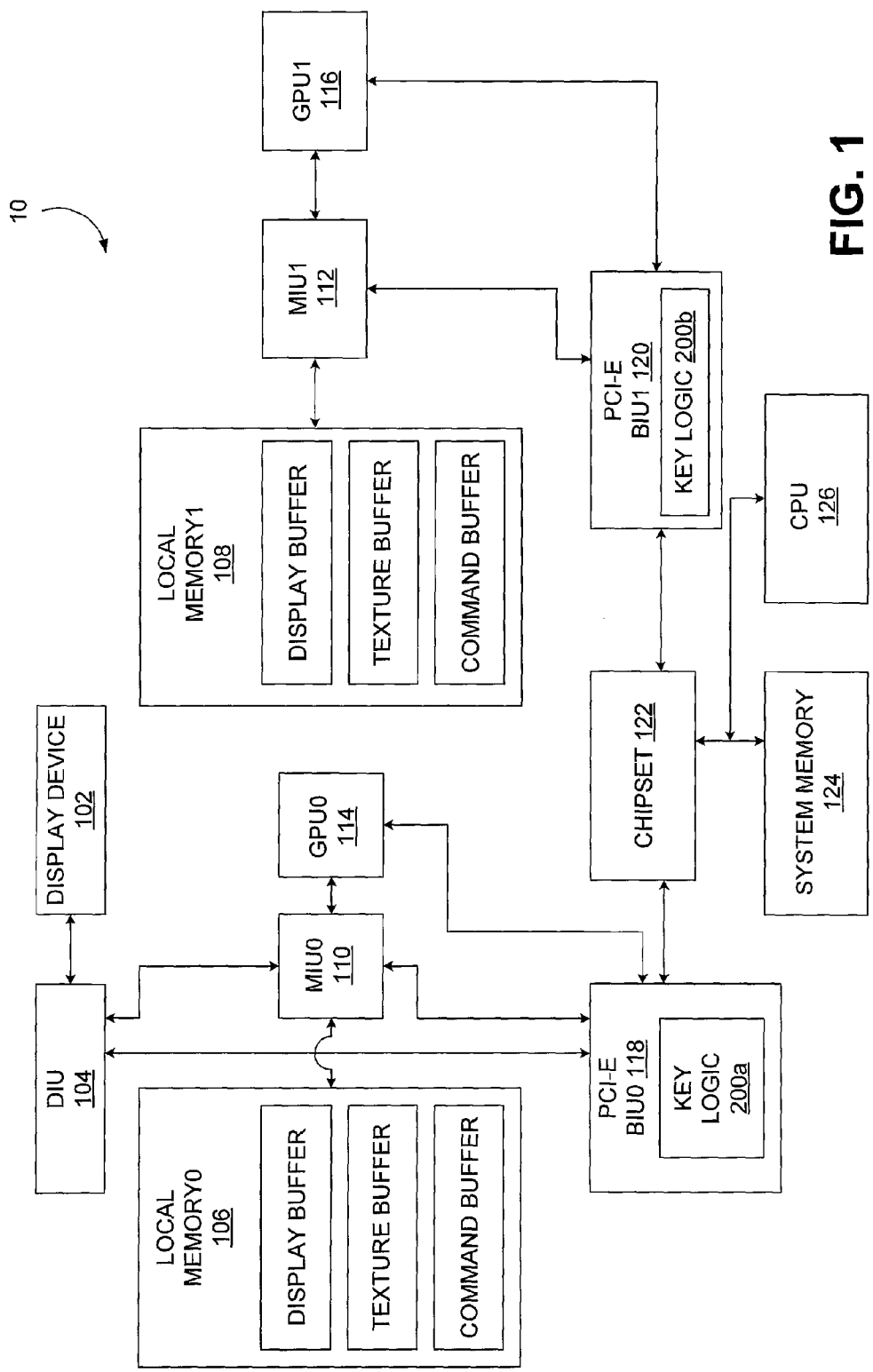
FIG. 1 is a block diagram of an embodiment of a multiple graphics processor system.

Disclosed herein are various embodiments of multiple graphics processor systems and methods (herein referred to also as multiple graphics processor system or systems). Such a multiple graphics processor system comprises multiple graphics processing units (GPUs) and bus interface units (BIUs). Each GPU maintains status information corresponding to the degree of completion of its internal processing, and this status information is communicated to the BIUs in the system in the form of a key or other status indicator. The BIUs of the multiple graphics processor system are each configured with key logic. Such key logic is configured to compare and hence determine which GPU has not advanced enough in processing of a particular frame to contribute its portion to final display rendering or RT-to-texture (i.e., render target-to-texture) processing for a given surface. The key logic, responsive to this comparison, generates a key corresponding to the GPU associated with this lowest advanced stage of processing, and communicates the key to its associated GPU for comparison with the status information of the associated GPU. Based on the comparisons performed at the GPUs, the GPUs can determine whether to enable access to its associated rendering or surface data. Such data can be communicated through push or pull mechanisms to a display controller and/or the frame buffer of the display controller for final display rendering, or for assembly of a final texture surface from the various GPUs as a preliminary procedure to final display rendering. Through such key communication mechanisms of the multiple graphics processor systems, synchronization for final display rendering or RT-to-texture processing is enabled among a plurality of GPUs.

In one final display rendering embodiment, each of a plurality of GPUs is responsible for rendering a portion of an image to be displayed by a display controller (i.e., a GPU responsible for final display rendering or texture surface rendering). The status of processing (e.g., completion of the particular processing stage for a corresponding draw command sequence) of a particular GPU is communicated to the other GPUs in the system (and vice versa) by writing status information in the form of a key value (further just key) to a register in each embedded BIU. The BIUs compare the key values corresponding to each GPU and, in one embodiment, select the key value with the smallest value for communication back to their respective GPU. Each GPU then compares its status information with the key value received from the associated BIU. If the key value from the respective BIU is greater than or equal to the status information for the respective GPU, access is enabled to the data associated with the respective GPU and the data can be communicated to the display controller (or corresponding frame buffer) for display rendering. In this manner, the display controller can coordinate final display rendering since a key value received from its associated BIU that is greater or equal to the value corresponding to its status information (key value) ensures the display controller that processing for the other GPUs has progressed or advanced sufficiently enough to enable final display rendering.

In another embodiment, in addition to or in lieu of the methodology described for the embodiment above, a texture surface is divided up among buffers (e.g., frame buffers) of the plurality of GPUs. The stage of texture processing of each surface portion is communicated by each respective GPU to the plurality of BIUs. Similar to the mechanisms described above, a comparison is implemented by key logic in each BIU, and the key of lowest value (or copy thereof) is returned to the respective GPU for further comparison to its respective status information to decide the degree of texture surface processing that has been completed compared to the various GPUs of the multiple graphics processor system. If the key value received from the associated BIU is greater than or equal to the status information for the respective GPU, access to associated texture surface data is enabled. Accordingly, the display controller can fetch the desired data from one or more of the GPUs. In some embodiments, data can be "pushed" from the various GPUs (or associated frame buffers) to the display controller (or associated frame buffer), and vice versa.

As one example pertaining to the completion of processing stages, without limitation, consider the logic stage of a rendering sequence for a frame as implemented by two GPUs (e.g., GPU0 and GPU1). Also, assume the frame has forty-nine (49) RT-to-texture surfaces corresponding to forty-nine draw commands and two more commands comprising a draw to the display buffer. Such commands may be embodied as follows: Draw-0 RT-to texture-0 (parallel), Draw-1 RT-to texture-1 (parallel), . . . Draw-48 RT-to texture-48 (parallel), Draw-49 RT-to display (use Texture-0 to 39 as texture), Draw-50 RT-to display (use Texture-40 to 48 as texture). From the above command sequence, it is observed that both GPU0 and GPU1 can render in parallel without waiting for each other until Draw-49. In Draw-49, both GPU0 and GPU1 need to know (e.g., for proper synchronization) that the previous forty (40) RT to texture processes have been completed before either can commence the Draw-49 command. If the GPU0 has not completed RT-to texture processing for the corresponding Draw-48 command and GPU1 has completed RT-to texture processing for the corresponding Draw-48 command, the lowest completed stage of processing is associated with GPU0. Similarly, for the Draw-50 command, both GPU0 and GPU1 need to know that the previous 40-48 RT RT-texture processing have been completed before either can commence Draw-50.

In contrast to conventional systems, the status information is handled directly by each GPU without host (e.g., CPU) processor intervention or private bus lines for communication of status information, providing true peer-to-peer processing with its concomitant efficiencies. Further, communication of status information for RT-to-texture processing synchronization is enabled, in contrast to conventional systems.

The embodiments of the multiple graphics processor systems can be implemented in hardware or a combination of hardware, software, and/or firmware. When implemented in hardware, the hardware can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Although described in the context of a graphics processor system, other multi-processor environments are also included within the scope of the preferred embodiments.

FIG. 1 is a block diagram of a multiple graphics processor system embodiment 10. In some implementations, the multiple graphics processor system 10 may be configured as a computer system, among other systems or devices. The multiple graphics processor system 10 comprises a display device 102 driven by a display interface unit (DIU) 104. The multiple graphics processor system 10 also comprises a display controller (graphics processing unit or GPU0 114) communicatively coupled to another graphics processing unit (GPU1 116), wherein the GPU0 114 comprises an architecture and functionality that is substantially mirrored in the GPU1 116. Multiple graphics processor system 10 comprises local memory (local memory0) 106 and local memory (local memory1) 108, which may comprise a display buffer, texture buffer, and command buffer, among other buffers or caches as would be appreciated by one having ordinary skill in the art. Local memory 106, 108 may also be referred to interchangeably herein as a frame buffer, storage unit, or simply memory. The local memory 106 is coupled to the GPU0 114 through a memory interface unit (MIU0) 110. Similarly, the local memory 108 is coupled to the GPU1 116 via MIU1 112. The MIU0 110, GPU0 114, and DIU 104 are coupled to a peripheral component interconnect express (PCI-E) compatible bus interface unit (BIU0) 118. Similarly, the MIU1 112 and GPU1 116 are coupled to BIU1 120. The BIUs 118 and 120 each comprise key logic 200 (e.g., 200a, 200b) configured to compare status information (e.g., indicators or keys) corresponding to GPU0 114 and GPU1 116, and one or more registers configured to store the status information. The key logic 200 is also configured to communicate the results of the comparison (e.g., a key) to the respective GPU. For instance, the key logic 200a of BIU0 118 communicates a key to the GPU0 114, and the key logic 200b of BIU1 120 communicates a key to the GPU1 116.

The BIU0 118 is coupled to BIU1 120 via a chipset 122 (e.g., north bride chipset) or switch. The chipset 122 comprises interface electronics to strengthen signals from a central processing unit (CPU) 126 (also referred to herein as a host processor) and to separate signals to and from a system memory 124 from those signals going to and from input/output (I/O) devices or components. The chipset 122 is connected to the BIUs 118 and 120 via a PCI-E bus protocol, although other manners of connection may be implemented in some embodiments (e.g., PCI, proprietary high speed bus, etc.).

The system memory 124 and the host processor (CPU) 126 are coupled together and to the chipset 122.

Additional GPUs (and BIUs) may be employed in some embodiments, as would be understood in the context of this disclosure by one having ordinary skill in the art. In one embodiment, the multiple graphics processor system 10 comprises all the components shown in FIG. 1, or fewer and/or different components than those shown in FIG. 1 in some embodiments. For instance, in some embodiments, additional components may be used, such as a south bridge chipset coupled to the chipset 122.

The multiple graphics processor system 10 buffers image surfaces and objects to be rendered in local memory 106, 108, and although the GPU0 114 is shown as the display controller, either one of the GPUs 114 or 116 may function as a display controller in some embodiments. In other words, in one embodiment, display device 102 may be coupled to the MIU1 112 via DIU 104 instead of the configuration for the DIU 104 and display device 102 shown in FIG. 1.

Figure 2:
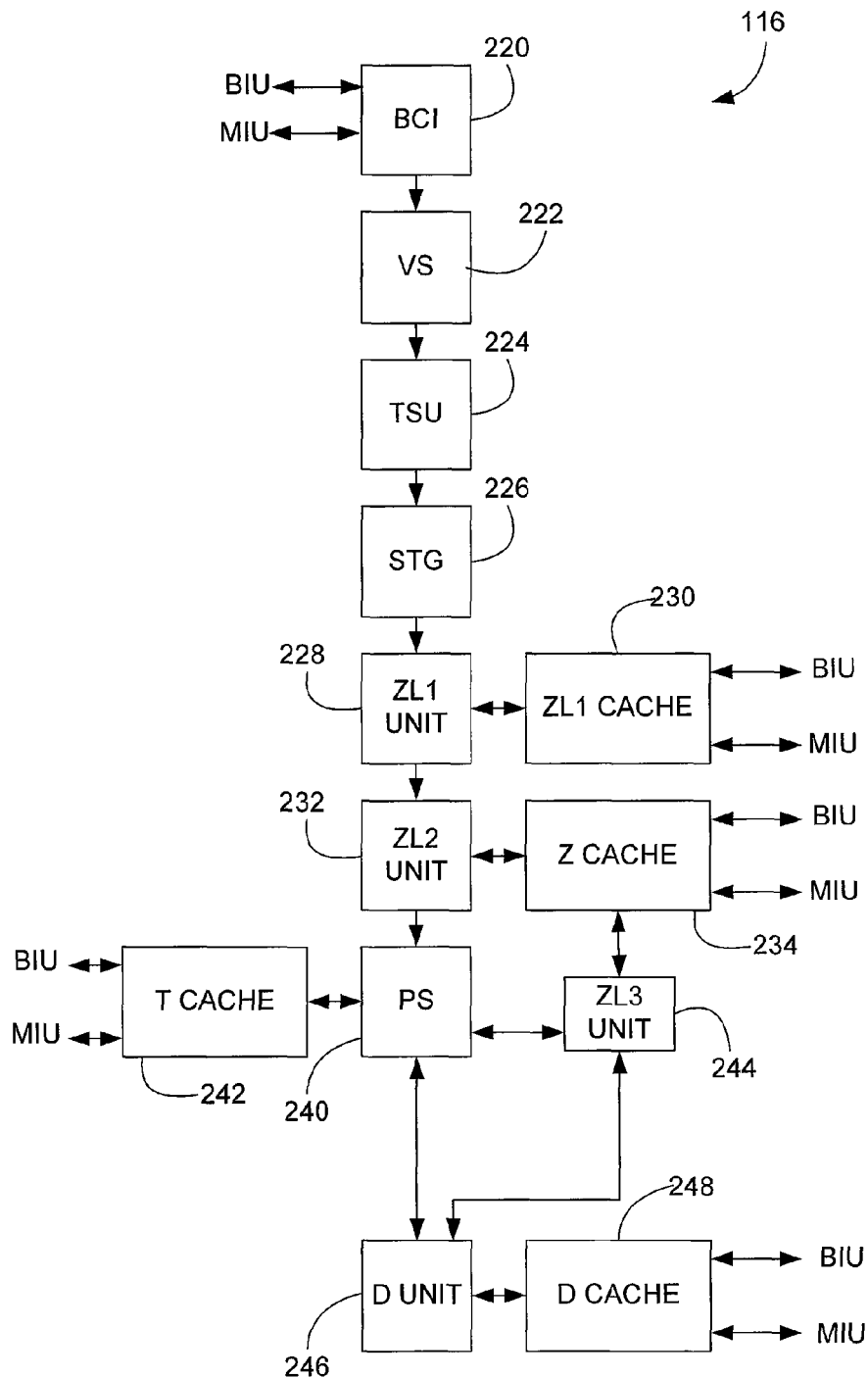
FIG. 2 is a functional block diagram of an embodiment of a graphics processing unit (GPU) of the multiple graphics processor system shown in FIG. 1.

FIG. 2 is a functional block diagram of an embodiment of GPU1 116. Additional or fewer components to those shown in FIG. 2 may also be included in some embodiments, such as registers, among other components. The GPU0 114 is similarly configured, and thus discussion of the same is omitted for brevity. The GPU1 116 may include a buffer control initialization (BCI) unit 220, vertex shader (VS) 222, triangle setup unit (TSU) 224, span and tile generation (STG) unit 226, ZL1 unit 228, ZL1 cache 230, ZL2 unit 232, Z cache 234, pixel shader (PS) unit 240, texture (T) cache 242, ZL3 unit 244, destination (D) unit 246, and D cache 248. In some embodiments, functionality of the D unit 246 and the D cache 248 may be combined. The BCI unit 220 receives data and commands via the BIU (e.g., BIU1 120) and MIU (e.g., MIU1 112), and responsively initializes the processing of the vertex data. The ZL1 and D caches 230 and 248, respectively, also interface (to perform read and write operations) with the MIU and BIU. The ZL2 unit 232 and the ZL3 unit 244 access the Z cache 234. The D unit 246 is coupled to the PS unit 240 and ZL3 unit 244, and is responsible for color functionality, as is known, and further accesses the D cache 248. The PS 240 accesses the T cache 242, which corresponds to texture processing according to well-known texture fetch and filter mechanisms.

In operation, the BCI unit 220 receives a command from an application driver or other software (not shown) to draw a triangle. The BCI unit 220 also receives vertex information corresponding to the triangle to be drawn. The vertex information is passed to the VS 222, where vertex transformations are implemented. In particular, objects are transformed from object space to work space and screen space as triangles. The triangles are passed to the TSU 224, which assembles primitives, and also performs well-known tasks such as bounding box generation, culling, edge function generation, and triangle level rejections, among other well-known functions. The TSU 224 passes data to the STG unit 226, which provides tile generation functionality, whereby the data objects are segmented into tiles (e.g., 8×8, 16×16, etc.) and passed to the ZL1 unit 228.

The ZL1 unit 228, like the ZL2 and ZL3 units 232, 244, respectively, performs z-value processing, such as high level (e.g., where fewer bits are consumed than similar processing at a lower level) rejection of z-values. The ZL units 228, 232, and 244 operate in conjunction with the ZL1 cache 230, Z cache 234, and Z cache 234, respectively. The PS unit 240 comprises a programmable unit that receives texture and pipelined data and provides outputs to the D unit 246 and ZL3 unit 244. The D unit 246 and ZL3 unit 244 are configured to perform alpha testing and stencil testing before values in the Z cache 234 or D cache 248 need to be updated. In one embodiment, the BIU and MIU are configured to send data and receive data according to the PCIE protocol and double data rate (DDR) memory protocol.

Figure 3:
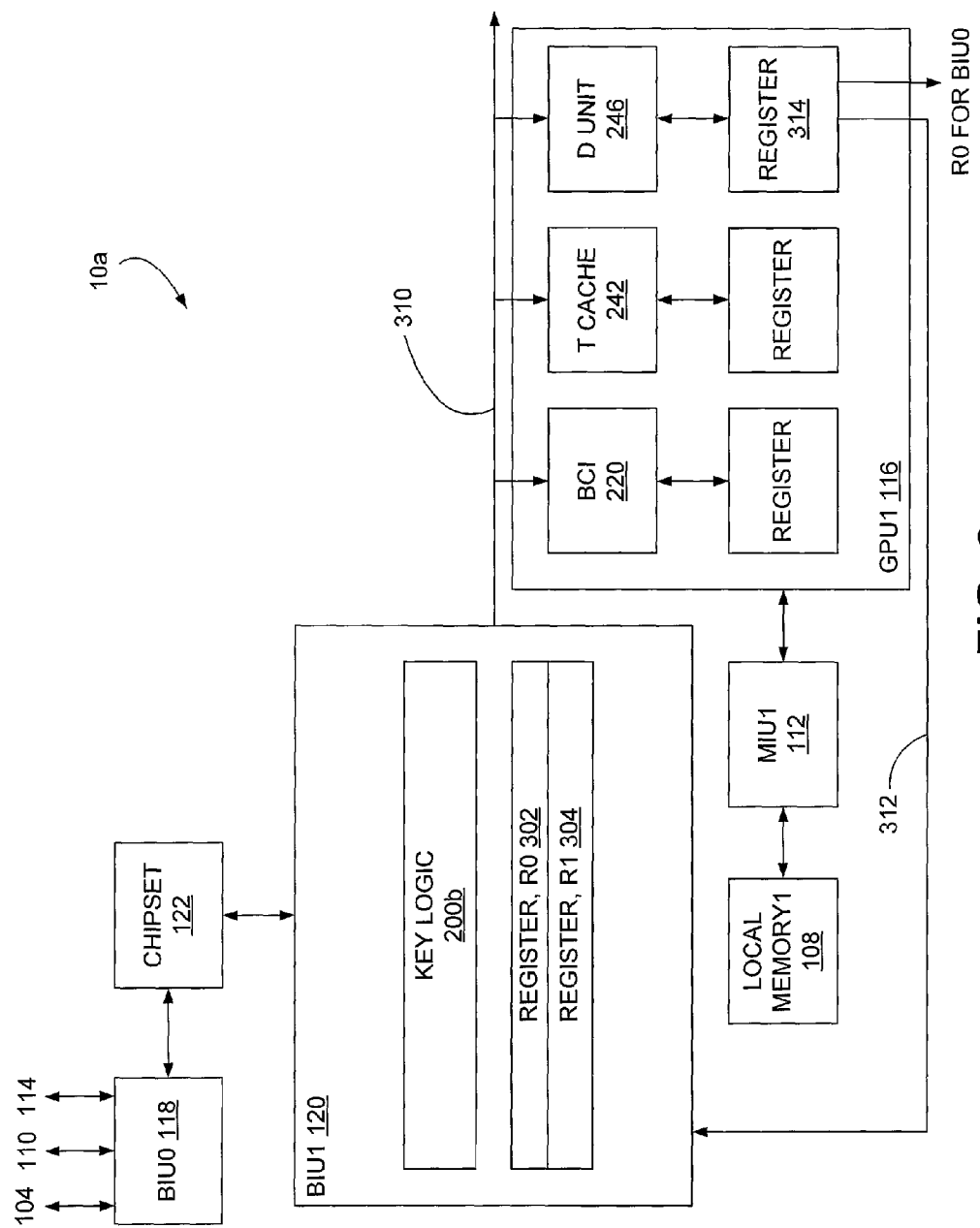
FIG. 3 is a block diagram that illustrates key communication between bus interface units (BIUs) and GPUs of the multiple graphics processor system shown in FIG. 1.

FIG. 3 is a block diagram of portions of the multiple graphics processor system 10 shown in FIG. 1, these portions designated multiple graphics processor system 10a. In particular, emphasis is placed on key processing functionality for the BIU1 120, with the understanding that similar functionality occurs in the BIU0 118. The BIU 120 comprises registers R0 302 and R1 304 corresponding to the two GPUs 114 and 116, respectively. Although shown with two registers, one skilled in the art would understand that additional registers may be implemented in some embodiments, such as when more than two GPUs are implemented. Registers 302 and 304 each comprise status information (e.g., a key or indicator that provides an indication of status of processing for the respective GPU), as explained below. The BIU1 120 also comprises key logic 200b, which is described further below. The BIU1 120 is coupled to chipset 122, which is coupled to BIU0 118. The BIU0 118 is coupled to its respective GPU0 114, as well as to MIU0 110 and DIU 104 as described in association with FIG. 1. Since the connectivity and components associated with GPU0 114 are shown and described in association with FIG. 1, further description of the same is omitted for brevity. The BIU1 120 is coupled to the GPU1 116. The GPU1 116, as described in association with FIG. 1, is coupled to the MIU1 112, which is coupled to local memory1 108. The GPU1 116 is shown with a few of the components described in association with FIG. 2, namely, the BCI unit 220, T cache 242, and D unit 246, along with respective registers including in particular, register 314 corresponding to D unit 246.

In one embodiment, the BIU1 120 receives status information from the GPU0 114 (e.g., from the register corresponding to D unit of the GPU0 114), which is stored in register R0 302. The BIU1 120 also receives status information from GPU1 116 (e.g., from register 314) over connection 312. Also, the status information of the D unit 246, stored in register 314 is communicated (e.g., via memory mapping) to the BIU0 118, which is stored in a register of the BIU 118 dedicated to GPU1 116 status information. The key logic 200b compares the key values in registers 302 and 304, and selects the lowest key value for communication over connection 310 to the GPU 1 116. The lowest key value signifies a lower stage of processing than the highest (or higher) key value, and thus provides an indication of relative completion of a stage of processing among the GPUs of the multi-graphics processor system 10a. The BCI unit 220 and T cache 242 each receive the key values, and store the same in their respective registers. The D unit 246 also receives the key value, and compares the key value received over connection 310 to status information stored in its internal register 314. If the key value received over connection 310 is lower in value than the status information (e.g., key value) stored in register 314, then the rendering data or surface data of GPU1 116 is not available for use (inaccessible) by the display controller 114. If the key value received over connection 310 is greater than or equal to the value corresponding to the status information stored in register 314, then the rendering or texture surface data of the GPU1 116 is available (accessible) for rendering or RT-to-texture processing by the display controller 114. Note that similar comparisons are performed at GPU0 114 and BIU0 118, such that synchronization of display and texture surface rendering is achieved. That is, the GPU1 116 can communicate the display rendering data to the GPU0 114 or local memory 106 for final display rendering, or the GPU0 114 can fetch the surface data as needed from the local memory1 108 corresponding to GPU1 116, enabling synchronization of the display rendering and other final rendering processes (e.g., assembly of pre-rendered texture surfaces) between the display controller 114 and other GPUs (e.g., GPU1 116).

In one embodiment, key values change on status boundaries, and key values are reset (e.g., to zero or a datum value) after completion of processing for each respective GPU (e.g., the key value is reset for GPU1 116 when all stages in the GPU1 116 have been completed). Thus, in one embodiment, each respective GPU (e.g., GPU0 114 and GPU1 116) updates the registers of the BIUs 118 and 120 at a time corresponding to key value changes.

With regard to the texture processing embodiments, further explanation of texture processing is described below. In particular, in some embodiments, the pre-rendered image can be used for final rendering processing. For instance, the rendered image in local memory0 106 can be stored in a texture surface (e.g., u-v screen space) of the local memory 106, and copied (e.g., direct memory access) to the local memory1 108 associated with the GPU1 116 (and vice versa). Thus, functionality for providing texture processing on the various portions of the final frame can be split among GPUs 114 and 116, which fetch and apply a texture surface to objects in respective portion of a final frame. In one embodiment, the display controller 114 fetches the texture surface or a portion thereof by re-directing its read operation from its local memory0 106 to the PCI-E bus. In another embodiment, the GPU1 116 copies the textured surface or a portion thereof to the local memory0 106 of the GPU0 114. Ultimately, the display controller 114 renders the final image frame in the local memory0 106 for display. In either case, key processing and communication is as described above.

One having ordinary skill in the art would understand in the context of this disclosure that, although the smallest key value is used as a basis for determining relative processing completion, some embodiments may use the largest key value as an indicator of relative processing completion, wherein the largest key value can be configured to represent (or logic can be configured to interpret) relative completion of processing in similar manner.

Figure 4:
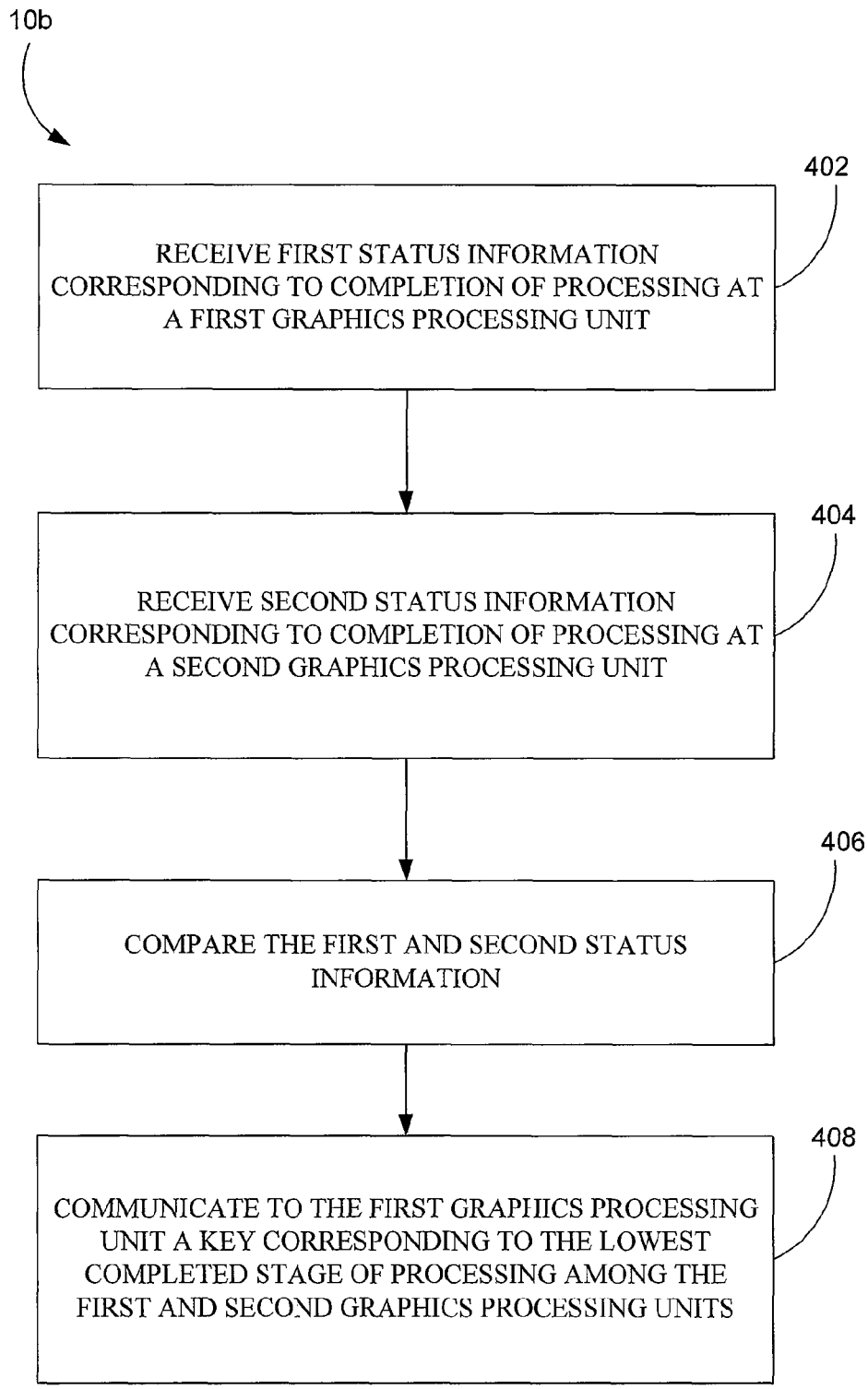
FIG. 4 is a flow diagram that illustrates one method embodiment from the perspective of key logic in a BIU as shown in FIG. 3.

In view of the above description, it will be appreciated that one multiple graphics processor method embodiment 10b, considered from the perspective of the key logic 200 and illustrated in FIG. 4, comprises receiving first status information corresponding to completion of processing at a first graphics processing unit (402), receiving second status information corresponding to completion of processing at a second graphics processing unit (404), comparing the first and second status information (406), and communicating to the first graphics processing unit a key corresponding to the lowest completed stage of processing among the first and second graphics processing units (408).

Figure 5:
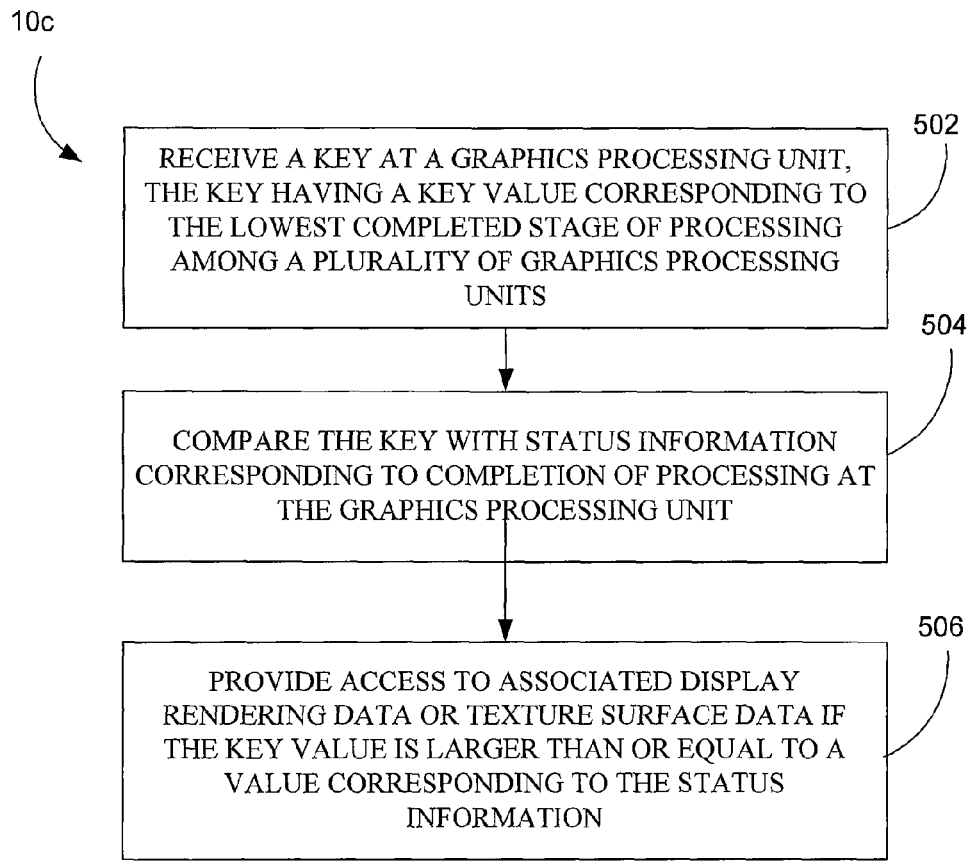
FIG. 5 is a flow diagram that illustrates one method embodiment from the perspective of a GPU as shown in FIG. 2.

Another method embodiment 10c, considered from the perspective of GPU such as GPU0 114 or GPU1 116 and illustrated in FIG. 5, comprises receiving a key at a graphics processing unit, the key having a key value corresponding to the lowest completed stage of processing among a plurality of graphics processing units (502), comparing the key with status information corresponding to completion of processing at the graphics processing unit (504), and providing access to associated display rendering data or texture surface data if the key value is larger than or equal to a value corresponding to the status information (506).

Any process descriptions or blocks in flow charts should be understood as representing logic, segments, or portions of code which include one or more executable instructions for implementing specific logical functions, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the disclosure, particularly, any "preferred" embodiments, are merely possible examples of implementations, merely set forth for a clear understanding of the principles of the multiple graphics processor systems and methods. Many variations and modifications may be made to the above-described embodiment(s) without departing substantially from the spirit and principles of the invention. All such modifications and variations are intended to be included herein within the scope of this disclosure.

What is claimed is:

1. A multiple graphics processor system, comprising:
a first graphics processing unit having first status information and a second graphics processing unit having second status information; and
first key logic corresponding to the first graphics processing unit, the first key logic configured to compare the first and second status information and communicate to the first graphics processing unit a key corresponding to a lowest completed stage of processing among the first and second graphics processing units, wherein the first graphics processing unit is configured to receive the key and compare the key to the first status information.

2. The system of claim 1, wherein responsive to the comparison between the key and the first status information, the first graphics processing unit accesses and renders data when the key value is greater than or equal to a value corresponding to the status information of the first graphics processing unit.

3. The system of claim 1, further comprising a first bus interface unit configured with the first key logic, the first bus interface unit coupled to the first graphics processing unit and to the second graphics processing unit.

4. The system of claim 3, further comprising a second bus interface unit configured with second key logic that comprises functionality of the first key logic, the second bus interface unit coupled to the first graphics processing unit, the second graphics processing unit, and the first bus interface unit.

5. The system of claim 4, wherein the first graphics processing unit is configured to communicate the first status information to the first bus interface unit and the second bus interface unit and the second graphics processing unit is configured to communicate the second status information to the first bus interface unit and the second bus interface unit.

6. The system of claim 4, wherein the first bus interface unit and the second bus interface unit each comprise registers for storing the first status information and the second status information.

7. The system of claim 1, wherein the first graphics processing unit and the second graphics processing unit update the first status information and the second status information, respectively, response to completion of processing.

8. The system of claim 1, wherein one of the first graphics processing unit and the second graphics processing unit comprise a display controller.

9. A method of synchronizing multiple graphics processing units, comprising:
receiving first status information corresponding to completion of processing at a first graphics processing unit;
receiving second status information corresponding to completion of processing at a second graphics processing unit;
comparing the first and second status information; and
communicating to the first graphics processing unit a key corresponding to a lowest completed stage of processing among the first and second graphics processing units.

10. The method of claim 9, wherein receiving the first status information and the second status information comprises receiving at a first register and a second register in a bus interface unit.

11. The method of claim 9, wherein comparing comprises selecting the lower value of the first status information or the second status information.

12. The method of claim 9, wherein comparing is implemented in logic in a bus interface unit.

13. The method of claim 9, further comprising:
receiving additional status information from one or more additional graphics processing units;
comparing status information for all the graphics processing units; and
communicating to the first graphics processing unit a key corresponding to a lowest completed stage of processing among the graphics processing units.

14. The method of claim 9, further comprising:
comparing the key with the first status information corresponding to completion of processing at the first graphics processing unit; and
providing access to associated display rendering data or texture surface data if the key value is larger than or equal to a value corresponding to the first status information.

15. A method of synchronizing multiple graphics processing units, comprising:
receiving a key at a graphics processing unit, the key having a key value corresponding to a lowest completed stage of processing among a plurality of graphics processing units;
comparing the key with status information corresponding to completion of processing at the graphics processing unit; and
providing access to associated display rendering data or texture surface data if the key value is larger than or equal to a value corresponding to the status information.

16. The method of claim 15, wherein receiving the key comprises receiving the key from a bus interface unit.

17. The method of claim 15, wherein receiving the key comprises receiving the key at a register in the graphics processing unit.

18. The method of claim 15, further comprising updating the status information when processing for a particular command sequence has been completed.

19. The method of claim 18, further comprising communicating the updated status information to a plurality of bus interface units corresponding to the plurality of graphics processing units.

* * * * *